United States Patent [19]

Iwasaki

[11] 3,956,202

[45] May 11, 1976

[54] PROCESS FOR PREPARING LOW SMOKE-GENERATING RIGID POLYURETHANE FOAM

[75] Inventor: Kazuo Iwasaki, Ohta, Japan

[73] Assignee: Kohkoku Chemical Industry Co. Ltd., Tokyo, Japan

[22] Filed: Apr. 26, 1974

[21] Appl. No.: 464,633

[30] Foreign Application Priority Data
Nov. 14, 1973  Japan .............................. 48-128077
Dec. 22, 1973  Japan .................................. 49-2582

[52] U.S. Cl. .................. 260/2.5 AK; 260/2.5 AD; 260/2.5 AM; 260/2.5 AJ
[51] Int. Cl.² ...................... C08G 18/14; C08K 5/15
[58] Field of Search ............... 260/2.5 AK, 2.5 AM, 260/2.5 AD, 2.5 AJ

[56] References Cited
UNITED STATES PATENTS

| | | | |
|---|---|---|---|
| 2,999,823 | 9/1961 | Dombrow | 260/2.5 AJ |
| 3,004,934 | 10/1961 | Dosmann | 260/2.5 AJ |
| 3,674,717 | 7/1972 | Fuzesi | 260/2.5 AK |
| 3,714,047 | 1/1973 | Marion | 260/2.5 AJ |
| 3,836,487 | 9/1974 | Carter | 260/2.5 AK |

FOREIGN PATENTS OR APPLICATIONS 705,937   3/1965   Canada .......................... 260/2.5 AJ Primary Examiner—C. Warren Ivy
Attorney, Agent, or Firm—Toren, McGeady and Stanger

[57] ABSTRACT

A process for preparing rigid polyurethane foam in which the major ingredients are a polyisocyanate, a polyol having more than three hydroxy groups and a hydroxyl value greater than 100, and blowing agents, comprising adjusting the ratio of the chemical equivalent of polyisocyanate to the polyol and blowing agent which react with the polyisocyanate to the range between 2 : 1 and 1 : 1, and adding a polymer of glucose and/or a derivative thereof in the form of a powder in the amount exceeding 5% by weight.

4 Claims, 3 Drawing Figures

PROCESS FOR PREPARING LOW SMOKE-GENERATING RIGID POLYURETHANE FOAM

DETAILED EXPLANATION OF INVENTION

The present invention relates to a process for preparing a low smoke-generating rigid polyurethane foam. Rigid polyurethane foam has been extensively used as thermal insulating material, light weight constructing material and floating material due to its excellent properties for such purposes. However, large evolution of smoke, because the materials are made from plastics in which polyurethane is the major constituent, restricts its use for constructural material to a considerable extent. Consequently, the problem arises as to how to reduce the amount of smoke generated in order to extend the use of rigid polyurethane foams.

As a measure to reduce the amount of smoke generated, solid carboxylic acids, such as adipic, fumaric and HET (chlorendic) acids are added to the rigid polyurethane foam in the course of preparation, as exemplified in U.S. Pat. Nos. 3,637,542, 3,639,307 and 3,647,724. Although the method makes it possible to reduce the amount of smoke generated to a half of its original value, these acids which are chemically active toward some ingredients of the polyurethane foam, such as the polyisocyanate, polyol and tertiary amine catalyst, may probably react with these ingredients while being remixed, leading to deterioration of the raw materials while being stored and to precipitation and solidification of solid carboxylic acids in the raw materials. Therefore the method is not yet applied in practical use.

The present invention intends to overcome these troubles. The process proposed in this invention involves addition of a powdery polymer of glucose and/or a derivative thereof to the raw material on preparing a rigid polyurethane foam. The polyurethane foam prepared by the process of this invention evolves a half or less smoke relative to ordinary polyurethane foams. A polymer of glucose, which is of a polymerized-glucose structure and contains hydroxy groups in the molecule, is chemically inactive toward both polyols and tertiary amines which compose the raw material for polyurethane foams. Therefore chemical reactions between these ingredients are not encountered while mixing. The situation is true also for the polyisocyanate and the mixture does not gell in a shorter time. Further a polymer of glucose can be thoroughly dispersed, though not dissolved, in the raw material for polyurethane foams, and therefore the mixture can be applied to the material for polyurethane foams without forming a precipitate if it is continuously stirred.

The process of this invention for preparing low smoke-generating rigid polyurethane foams essentially resides in adding a powdered polymer of glucose and/or a derivative thereof to the raw material for polyurethane foams at room temperature. The proportions of ingredients in the mixture should be approximately equal in chemical equivalents. In other words, the amount of polyisocyanate in equivalents should be approximately equal to the amounts in equivalents of the polyol and the blowing agent which react with the polyisocyanate. The polymer of glucose need not be considered in the calculation of the equivalents, because the hydroxy groups in a polymer of glucose do not substantially react. The ratio in equivalents of polyisocyanate to other substances which react with polyisocyanate (exclusive of polymers of glucose) should be less than 2 : 1, preferably less than 1.5 : 1 and the lower limit thereof be about 1 : 1. Presence of an excessive amount of polyisocyanate results either in the formation of isocyanurate rings which contain more heat resistant bonding than those in the urethane, when a catalyst for forming isocyanurate is present, leading to more evolution of smoke on combustion, or in a decreased formation of desired polymers due to the presence of an excess of isocyanate in the absence of the catalyst.

A polymer of glucose and/or derivative thereof should be in the form of a fine powder. More particularly they should be finer than 20 mesh, preferably finer than 42 mesh. The finer the particle size of the polymer of glucose and/or derivative thereof, the better is the dispersion and stability in the mixture and the uniformity of the foam obtained.

Glucose polymers and/or derivative thereof to be used in this invention include cellulose and/or derivatives thereof and starch and/or derivatives thereof.

Any cellulose and derivatives thereof which are powdery at room temperature can be used in the present invention; which includes crystalline cellulose, noncrystalline (or amorphous) cellulose and the mixture thereof in an arbitrary proportions. Derivatives of cellulose, such as, alkyl cellulose and carboxymethyl cellulose may be used.

Alkyl cellulose such as, methyl cellulose, ethyl cellulose and propyl cellulose may be used either alone or in the combination of more than two members.

As carboxymethyl cellulose, cellulose ethers prepared by the reaction of alkali cellulose with chloroacetic acid may be used; practically effective is sodium carboxymethyl cellulose, or sodium cellulose glycolate.

Starch and/or any derivatives thereof which are/is powder at room temperature could be used in this invention. These substances include natural starch, esteric and etheric derivatives of starch. Natural starch, a high molecular substance from D-glucose molecules intercombined to form $\alpha$-1,4-glucoside, is a mixture of amylose in a straight chain structure and amylopectin in a branched structure. Any proportion of amylose to amylopectin in starch is allowed for use to the purpose of this invention, therefore all natural starch may be used. Natural starch includes, glutinous rice, rice, wheat, corn, glutinous corn, potato, sweet potato, sago, tapioca, banana and arrowroot starch.

The starch derivatives used in this invention include acetylated, nitrated, methylated and carboxymethylated starch. Acetylated starch contains acetyl groups of an arbitrary content which have substituted 1 to 3 hydroxyl groups on each intermediate glucose rings, while methylated starch contains methyl groups of an arbitrary content which have substituted 1 to 3 hydroxyl groups on each intermediate glucose rings. Methylated starch containing more methoxyl groups is more soluble and more dispersible in the raw materials (for example, polyols and water) of rigid polyurethane foams.

In the present invention, addition of more than 5 % of a polymer of glucose and/or a derivative thereof is sufficient to suppress the amount of evolved smoke to less than a half of that otherwise expected.

Polymers of glucose and/or derivatives thereof contain many oxygen atoms in their chemical formula and therefore when added to rigid polyurethane foams they act to assist carbonization of the surface of polyurethane foams on combustion. More particularly, polymers of glucose and/or derivatives thereof are dispersed in the raw material for preparing rigid polyurethane foams and are present also in the surface layer when foamed. On combustion, these polymers of glucose and/or derivatives thereof are rapidly burnt to carbonization which cover the surface of the foams and prevent further combustion into the inner layers, thus giving the flame retardancy property. Owing to the rapid burning of the surface of rigid polyurethane foams due to the action of polymers of glucose and/or derivatives thereof, less amount of smoke is evolved than otherwise.

Raw materials commonly used in ordinary rigid polyurethane foams can also be used as the raw materials for the rigid polyurethane foams in the present invention. Namely, the raw materials for preparing rigid polyurethane foams, which include a polyisocyanate, polyols having more than 3 hydroxyl groups in a molecule and a hydroxyl value greater than 100, catalyst, surfactant, blowing agent and flame retardant if necessary, can be used for the present purpose.

Any polyol which is used for preparing ordinary rigid polyurethane foams can also be used in this invention. For example, polyether-polyols prepared by an addition reaction of one or more alkylene oxides (such as ethylene oxide, propylene oxide and butylene oxide) with glycerine, trimethylolpropane, pentaerythrit, sorbit, sucrose, ethylenediamine and 4,4'-diaminodiphenylmethane can be used as a reaction initiator. Also suitable are polyester-polyols having end hydroxyl groups which are prepared by a condensation reaction of polycarboxylic acid, such as, adipic acids and phthalic acids with a polyhydroxyl alcohol, such as, ethyleneglycol and trimethylolpropane. The polyols used should contain more than 3 hydroxyl groups per molecule and the hydroxyl value greater than 100, preferably than 150. If the number of hydroxyl groups is smaller or the hydroxyl value is lower than the said values, a lower degree of cross-linking will probably result and consequently practical sufficient strength and dimensional stability in rigid polyurethane foams can not be obtained. The polyols may be used either alone or in combination of any two or more.

Polyisocyanates available for the purpose include tolylenediisocyanate (hereinafter designated TDI), 4,4'-diphenylmethanediisocyanate (hereinafter designated MDI) and hexamethylenediisocyanate, among which crude materials of TDI and MDI are particularly useful. Further, a prepolymer having end isocyanate groups may be used which can be prepared by the reaction of the above polyisocyanate in an excessive amount with a polyol containing more than 2 hydroxyl groups per molecule.

Useful catalysts include tertiary amine, such as, triethylamine, triethylenediamine and pentamethyldiethylenetriamine, and/or organometallic compounds, such as, dibutyltindilaurate, dibutyltindiacetate, potassium acetate and potassium propionate. Surfactants include non-ionic surfactants such as, polyoxyalkylenealkylether and polyoxyalkylenealkylaminoether and/or silicone oils, such as, organo-polysiloxane and siloxane-oxyalkylene copolymers. Blowing agents used in the present invention include reactive blowing agents (such as water and nitroalkanes) which evolve carbon dioxide on reaction with isocyanate and/or low boiling solvents, such as, trichloromonofluoromethane and dichlorodifluoromethane. Flame retardant used include phosphoric esters, such as, tricresyl phosphate, tris(2-chloroethyl)phosphate, tris (chloropropyl) phosphate, O,O-diethyl-N,N,-bis(2-hydroxyethyl)-aminomethyl phosphonate and/or metal oxides, such as, antimony oxide, alumina and antimony oxychloride.

In the process of the present invention, ingredients of the reaction mixture and polymers of glucose and/or derivatives thereof may be mixed to form a uniform mixture. Either batch or continuous operations may be used. Mechanical mixing by mixing of high pressure-jet streams of ingredients and spraying of the ingredients at a high or low pressure are all recommended. Consequently, polymers of glucose to be used in the present invention may be mixed beforehand in the reaction mixture (containing either polyisocyanate or components other than polyisocyanate) and all the ingredients are mixed at a time to produce rigid polyurethane foams. Alternatively, powders of polymers of glucose may be transported in a separate route and sprayed in a jet to prepare a reaction mixture. Otherwise, both the reaction mixture and polymers of glucose may be separately sprayed in jets for complete thorough mixing in the air. In the mixing operation, the most important is to obtain a uniform mixture whatever the methods of mixing and agitation may be. When a non-uniform mixture is used, the physical properties of the foam may have localized variations, leading to local shrinkage or swelling, which should be undoubtedly avoided in the products.

The rigid polyurethane foam produced by the process of this invention exhibits excellent property of low smoke-generation. Thus, the smoke-generation coefficient per unit areas (expressed hereinafter by $C_A$) of the foams produced by the present invention, as determined by the testing method in JIS A-1321 was less than a half of those for conventional rigid polyurethane foams.

The foams produced by the process of this invention exhibit not only an excellent property of low smoke-generation, but also light weight, high strength, excellent thermal insulation and dimensional stability which essentially belong to the properties of general rigid polyurethane foams. Therefore, the foams of this invention can be widely applied to constructural material, thermal insulating material and lightweighted structural material either alone or in a sandwich or a laminated structure with colored iron plates, zinc plated iron plates, gypsum boards, asbestos slate boards and sheets of paper.

This invention will be illustrated by referring to examples, but the invention will by no means be restricted by the examples. In the examples "parts" means "parts by weight".

In the Examples that follow, Crude MDI is a crude product of diphenylmethane diisocyanate containing 31% of isocyanate groups; Polyol A is a polyether-polyol of a hydroxyl value of 450 prepared by adding propylene oxide to sucrose as an initiator, and Polyol B is a polyether-polyol of a hydroxyl value of 500 prepared by adding propylene oxide to sorbit as an initiator; Silicone oil is a silicone surfactant (SH-193 supplied from Toray Silicone Co.); Methyl cellulose is a product prepared by substituting about 30% of the hydroxyl groups in cellulose by methoxyl groups and a 2% aqueous solution thereof possesses a viscosity of 100 poise (at 20°C), the particle size being approximately 60 mesh; Potato starch is a commercially available starch which is then dried for 3 hours at 120°C (the particle size being about 270 mesh): Corn starch is commercially available starch which is then dried for 3 hours at 120°C (the particle size being about 270 mesh); Wheat starch is a commercially available starch which is then dried for 3 hours at 120°C (the particle size being about 270 mesh); and the ratio in chemical equivalents is the ratio of the number of chemical equivalents of polyisocyanate to the number of chemical equivalents of the substances that react with the polyisocyanate (exclusive of glucose polymers and derivatives thereof).

Physical properties of the foams obtained were determined as follows: the apparent density by ASTM D 1622-63, the flammability by ASTM D 1692-68, the smoke-generation coefficient $C_A$ by JIS A 1321 (dimensions of test specimens being 15 × 220 × 220 mm) and friability by ASTM C 421-61.

Figure 1:
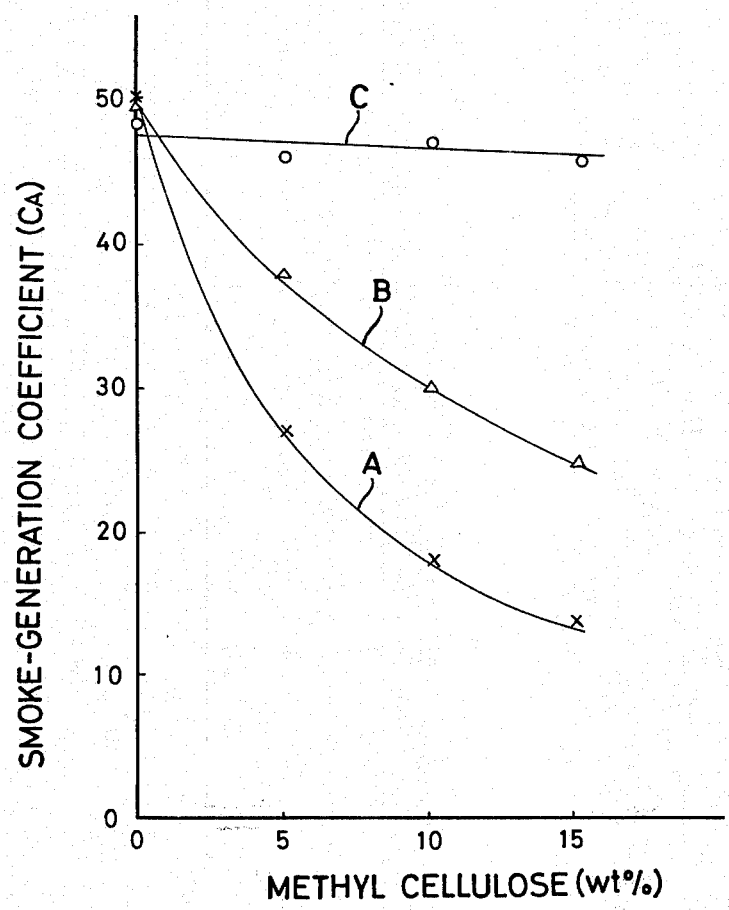
FIG. 1 shows the relation between amounts in percentage by weight of methyl cellulose added and the smoke-generation coefficient ($C_A$).

Curve A: Curve expressing the smoke-generation coefficients when the ratio in chemical equivalents is 1.05.

Curve B: Curve expressing the smoke-generation coefficient when the ratio in chemical equivalents is 2.00.

Curve C: Curve expressing the smoke-generation coefficient when the ratio in chemical equivalents is 3.00.

Curve D: Curve expressing the smoke-generation coefficient when the ratio in chemical equivalents is 1.05.

Curve E: Curve expressing the smoke-generation coefficient when the ratio in chemical equivalents is 3.00.

Curve F: Curve expressing the smoke-generation coefficient when the ratio in chemical equivalents is 4.00.

Curve G: Curve expressing the smoke-generation coefficient when the ratio in chemical equivalents is 1.05.

EXAMPLES 1 THROUGH 11

Raw materials itemized in Table 1 were weighed in a 1 liter polyethylene beaker which, after vigorous agitation for 20 sec. with a cage-like mixer (3,400 rpm), were foamed in a wooden box, to obtain foamed matter.

COMPARISON EXAMPLES 1 THROUGH 3

Raw materials itemized in Table 1 were treated in the same manner as in Examples 1 through 11, and foams were obtained.

Table 1

| Item | Example | | | | | | | | | | | Comparison example | | |
|---|---|---|---|---|---|---|---|---|---|---|---|---|---|---|
| | 1 | 2 | 3 | 4 | 5 | 6 | 7 | 8 | 9 | 10 | 11 | 1 | 2 | 3 |
| Reaction mixture (in parts) | | | | | | | | | | | | | | |
| Crude MDI | 115 | 115 | 115 | 164 | 219 | 219 | 219 | 328 | 328 | 328 | 328 | 115 | 219 | 328 |
| Polyol A | 100 | 100 | 100 | 100 | 100 | 100 | 100 | 100 | 100 | 100 | 100 | 100 | 100 | 100 |
| Silicone oil | 1 | 1 | 1 | 1 | 1 | 1 | 1 | 1 | 1 | 1 | 1 | 1 | 1 | 1 |
| Triethylenediamine | 0.5 | 0.5 | 0.5 | 0.5 | 0.5 | 0.5 | 0.5 | 0.5 | 0.5 | 0.5 | 0.5 | 0.5 | 0.4 | 0.3 |
| Potassium acetate | 0 | 0 | 0 | 0 | 0 | 0 | 0 | 5.0 | 5.0 | 5.0 | 0 | 0 | 2.0 | 5.0 |
| Dibutyl tin dilaurate | 0.1 | 0.1 | 0.1 | 0.1 | 0.1 | 0.1 | 0.1 | 0.1 | 0.1 | 0.1 | 0.1 | 0.1 | 0.1 | 0.1 |
| Trichloromonofluoromethane | 35 | 35 | 35 | 35 | 35 | 35 | 35 | 80 | 80 | 80 | 80 | 35 | 62 | 80 |
| Tris(2-chloroethyl) phosphate | 10 | 10 | 10 | 10 | 10 | 10 | 10 | 10 | 10 | 10 | 10 | 10 | 10 | 10 |
| Methylcellulose | 14 (5%) | 30 (10%) | 46 (15%) | 55 (15%) | 19 (5%) | 41 (10%) | 65 (15%) | 27 (5%) | 58 (10%) | 92 (15%) | 93 (15%) | 0 (0%) | 0 (0%) | 0 (0%) |
| Ratio in chemical equivalent | 1.05 | 1.05 | 1.05 | 1.50 | 2.00 | 2.00 | 2.00 | 3.00 | 3.00 | 3.00 | 3.00 | 1.05 | 2.00 | 3.00 |
| Physical properties of foam | | | | | | | | | | | | | | |
| Apparent density(lb/ft³) | 1.8 | 1.9 | 1.9 | 1.9 | 1.9 | 1.9 | 2.0 | 1.9 | 1.9 | 1.9 | * | 1.8 | 1.9 | 1.9 |
| Flammability | ** | ** | ** | ** | ** | ** | ** | ** | ** | ** | | ** | ** | ** |
| $C_A$ | 27 | 18 | 14 | 18 | 38 | 30 | 25 | 46 | 47 | 46 | | 50 | 50 | 48 |

Remarks:
*Shrinkage
**Self-extinguishment

It is seen from the results that the property of smoke-generation was decreased with the increase in the added amount of methyl cellulose when the ratio in chemical equivalent was 1.05, and that the effect to reduce smoke-generation diminished as the ratio in chemical equivalent of rigid polyurethane foams grew large, as shown in the table. When the amount of methyl cellulose exceeded 20%, the remarkably increased viscosity of the raw materials made agitation difficult, and uniform foams could not be sometimes obtained.

EXAMPLES 12 THROUGH 13

In place of the methyl cellulose in Example 3 above, fine crystalline powders of sodium carboxymethyl cellulose and cellulose (particle size of both of the compounds was about 100 mesh) were used respectively. Foams produced in the same process gave results shown in Table 2. The $C_A$ values of both foams were less than a half of those for conventional rigid polyurethane foams.

COMPARISON EXAMPLES 4 THROUGH 7

Methyl cellulose in Example 3 above was replaced by a polyhydroxyl alcohol or a saccharide which was solid at room temperature, such as, sucrose, pentaerythrit, mannit and glucose. In neither case could the smoke-generating property be effectively reduced. Results are shown in Table 2.

EXAMPLE 14

In the process according to Example 3 above, polyol A was replaced by polyol B. With the ratio in chemical equivalent being 150 and use of 15% of methyl cellulose foams were prepared in the same manner. Results obtained are shown in Table 2. The $C_A$ value of the product was less than ⅓ of those of conventional rigid polyurethane foams.

EXAMPLE 15

In the process according to Example 3 above, tris(2-chloroethyl)phosphate (10 parts) was removed from the raw materials with other ingredients remaining unchanged. The foam prepared from the mixture showed the properties as seen in Table 2.

From the results, it is seen that even an inflammable rigid polyurethane foam can be made low smoke-generating by adding methyl cellulose to the raw materials.

EXAMPLE 16

A mixture consisting of the followng components was foamed in the same manner as in Example 1, to obtain a foam.

| | |
|---|---|
| Crude MDI | 115 |
| Polyol A | 100 |
| Silicone oil | 1 |
| Triethylenediamine | 1.0 |
| Dibutyl tin dilaurate | 0.1 |
| Trichloromonofluoromethane | 55 |
| Tris(2-chloroethyl)phosphate | 10 |
| Methyl cellulose | 24.5 |
| Potato starch | 24.5 |
| Ratio in chemical equivalent | 1.05 |

Apparent density was 2.0 lb/ft³, flammability property was self-extinguishment, and $C_A$ was 18.

COMPARISON EXAMPLES 8 THROUGH 10

The materials shown in Table 3 were treated in the same manner as Example 1 to obtain foams.

EXAMPLES 17 THROUGH 31

The materials shown in Table 3 were treated to obtain a foam in the same manner as in Example 1.

Table 2

| Item | Example 12 | Example 13 | Example 14 | Example 15 | Comparison 4 | Comparison 5 | Comparison 6 | Comparison 7 |
|---|---|---|---|---|---|---|---|---|
| Reaction mixture (in parts) | | | | | | | | |
| Crude MDI | 115 | 115 | 126 | 115 | 115 | 115 | 115 | 115 |
| Polyol A | 100 | 100 | | 100 | 100 | 100 | 100 | 100 |
| Polyol B | | | 100 | | | | | |
| Silicone oil | 1 | 1 | 1 | 1 | 1 | 1 | 1 | 1 |
| Triethylenediamine | 0.5 | 0.5 | 0.5 | 0.5 | 0.5 | 0.5 | 0.5 | 0.5 |
| Dibutyl tin dilaurate | 0.1 | 0.1 | 0.1 | 0.1 | 0.1 | 0.1 | 0.1 | 0.1 |
| Trichloromonofluoromethane | 35 | 35 | 35 | 35 | 35 | 35 | 35 | 35 |
| Tris(2-chloroethyl)phosphate | 10 | 10 | 10 | 0 | 10 | 10 | 10 | 10 |
| Methylcellulose | 0 | 0 | 46 (15%) | 46 (15%) | | | | |
| Sodium carboxymethyl cellulose | 46 (15%) | | | | | | | |
| Microcrystalline powders of cellulose | | 46 (15%) | | | | | | |
| Sucrose | | | | | 46 (15%) | | | |
| Pentaerythrit | | | | | | 46 (15%) | | |
| Mannit | | | | | | | 46 (15%) | |
| Glucose | | | | | | | | 46 (15%) |
| Ratio in chemical equivalent | 1.05 | 1.05 | 1.05 | 1.05 | 1.05 | 1.05 | 1.05 | 1.05 |
| Physical properties of foam | | | | | | | | |
| Apparent density (lb/ft³) | 1.9 | 1.9 | 1.9 | 1.8 | 2.2 | 2.1 | 2.2 | 2.0 |
| Flammability | ** | ** | ** | *** | ** | ** | ** | ** |
| $C_A$ | 22 | 25 | 15 | 15 | 40 | 41 | 39 | 37 |

Remarks:
**Self-extinguishment
*** Burning

Table 3

| Item | Compar. Example 8 | Example 17 | Example 18 | Example 19 | Example 20 | Example 21 | Compar. Example 9 | Example 22 | Example 23 | Example 24 | Example 25 | Example 26 |
|---|---|---|---|---|---|---|---|---|---|---|---|---|
| Reaction mixture (in parts) | | | | | | | | | | | | |
| Crude MDI | 115 | 115 | 115 | 115 | 115 | 115 | 328 | 328 | 328 | 328 | 328 | 328 |
| Polyol A | 100 | 100 | 100 | 100 | 100 | 100 | 100 | 100 | 100 | 100 | 100 | 100 |
| Silicone oil | 1 | 1 | 1 | 1 | 1 | 1 | 2 | 2 | 2 | 2 | 2 | 2 |

Table 3-continued

| Item | Compar. Example 8 | Example 17 | Example 18 | Example 19 | Example 20 | Example 21 | Compar. Example 9 | Example 22 | Example 23 | Example 24 | Example 25 | Example 26 |
|---|---|---|---|---|---|---|---|---|---|---|---|---|
| Triethylenediamine | 1.0 | 1.0 | 1.0 | 1.0 | 1.0 | 1.0 | 0 | 0 | 0 | 0 | 0 | 0 |
| Potassium acetate | 0 | 0 | 0 | 0 | 0 | 0 | 4 | 4 | 4 | 4 | 4 | 4 |
| Dibutyl tin dilaurate | 0.1 | 0.1 | 0.1 | 0.1 | 0.1 | 0.1 | 0.2 | 0.2 | 0.2 | 0.2 | 0.2 | 0.2 |
| Trichloromonofluoromethane | 35 | 45 | 55 | 55 | 57 | 60 | 90 | 100 | 105 | 110 | 115 | 120 |
| Tris(2-chloroethyl) phosphate | 10 | 10 | 10 | 10 | 10 | 10 | 20 | 20 | 20 | 20 | 20 | 20 |
| Potato starch | 0 (0%) | 14 (5%) | 31 (10%) | 49 (15%) | 70 (20%) | 94 (25%) | 0 (0%) | 29 (5%) | 62 (10%) | 100 (15%) | 143 (20%) | 191 (25%) |
| Ratio in chemical equivalent | 1.05 | 1.05 | 1.05 | 1.05 | 1.05 | 1.05 | 3.00 | 3.00 | 3.00 | 3.00 | 3.00 | 3.00 |
| Physical properties of foam | | | | | | | | | | | | |
| Apparent density (lb/ft$^3$) | 1.8 | 1.9 | 1.8 | 1.9 | 1.9 | 1.9 | 1.9 | 2.0 | 1.9 | 1.9 | 1.9 | 1.9 |
| Flammability | ** | ** | ** | ** | ** | ** | ** | ** | ** | ** | ** | ** |
| $C_A$ | 50 | 35 | 22 | 16 | 15 | 15 | 51 | 44 | 38 | 33 | 31 | 30 |
| Friability (%) | 30 | 20 | 13 | 13 | 11 | 6 | 78 | 76 | 74 | 74 | 67 | 53 |

| Item | Compar. Example 10 | Example 27 | Example 28 | Example 29 | Example 30 | Example 31 |
|---|---|---|---|---|---|---|
| Reaction mixture (in parts) | | | | | | |
| Crude MDI | 433 | 433 | 433 | 433 | 433 | 433 |
| Polyol A | 100 | 100 | 100 | 100 | 100 | 100 |
| Silicone oil | 3 | 3 | 3 | 3 | 3 | 3 |
| Triethylenediamine | 0 | 0 | 0 | 0 | 0 | 0 |
| Potassium acetate | 6 | 6 | 6 | 6 | 6 | 6 |
| Dibutyl tin dilaurate | 0.3 | 0.3 | 0.3 | 0.3 | 0.3 | 0.3 |
| Trichloromonofluoromethane | 110 | 120 | 125 | 130 | 135 | 141 |
| Tris(2-chloroethyl) phosphate | 30 | 30 | 30 | 30 | 30 | 30 |
| Potato starch | 0 (0%) | 36 (5%) | 77 (10%) | 125 (15%) | 177 (20%) | 238 (25%) |
| Ratio in chemical equivalent | 4.00 | 4.00 | 4.00 | 4.00 | 4.00 | 4.00 |
| Physical properties of foam | | | | | | |
| Apparent density (lb/ft$^3$) | 1.9 | 1.8 | 1.9 | 1.9 | 1.9 | 2.0 |
| Flammability | ** | ** | ** | ** | ** | ** |
| $C_A$ | 55 | 53 | 53 | 51 | 51 | 50 |
| Friability (%) | 85 | 83 | 80 | 79 | 70 | 61 |

Remark:
**Self-extinguishment

Figure 2:
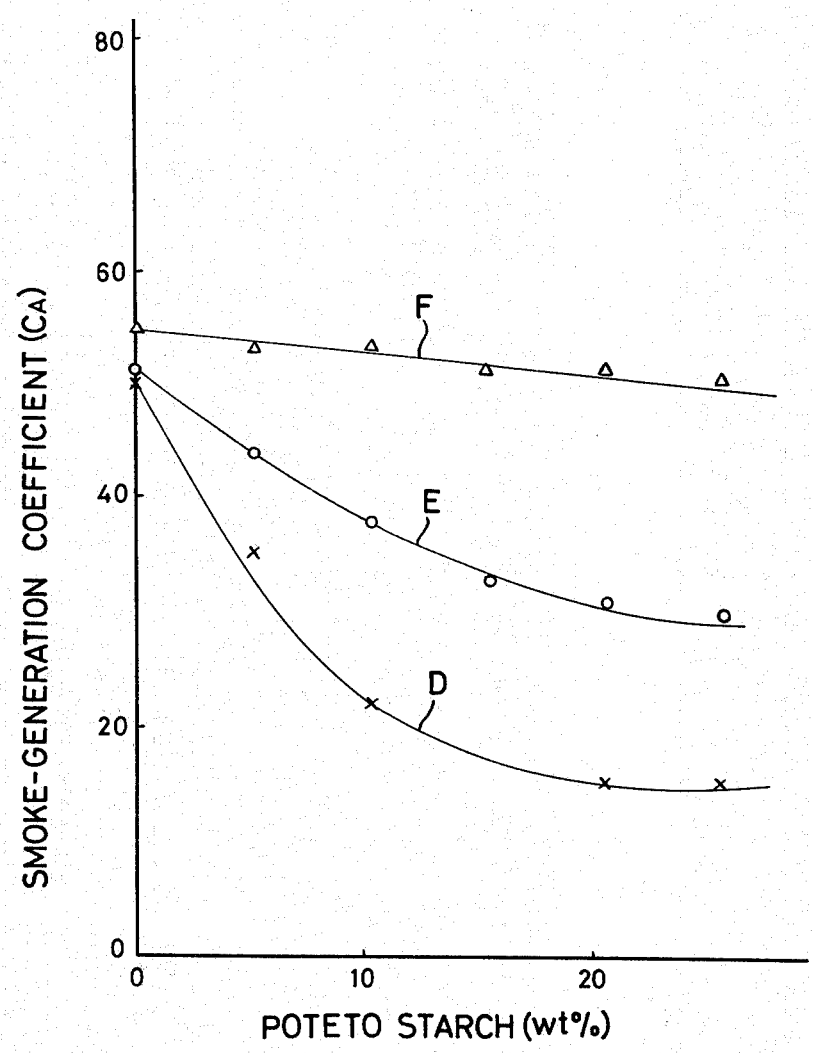
FIGS. 2 and 3 show the relation between amounts in percentages by weight of starch added and the smoke-generation coefficient ($C_A$).

In Comparison Examples 8 through 10 and Examples 17 through 31, flammability and the smoke-generating property were determined with those rigid polyurethane foams prepared in each example which had approximately an equal apparent density of 1.9 lb/ft$^3$. It was observed from the results that the smoke-generating property was decreased with the increase in the amount of potato starch added when the ratio in chemical equivalents was 1.05, and that the effect of adding potato starch on the decrease in the smoke-generating property becomes less marked for rigid polyurethane foams of a larger ratio in chemical equivalents, as is obvious in Table 3 and FIG. 2. FIG. 2 shows the relation between the amount of starch added and the smoke-generation coefficient in rigid polyurethane foams of apparent density about 1.9 lb/ft$^3$. Curves D, E and F correspond to the ratio in chemical equivalents 1.05, 3.00 and 4.00, respectively. The smoke-generation coefficients are larger on Curve E than on Curve D, and larger on Curve F than on Curve E, as is readily seen from the figure. When the amount of starch used exceeds 30%, it may be impossible that a mixture of raw materials can be agitated owing to much increased viscosity to produce uniform rigid polyurethane foams.

COMPARISON EXAMPLE 11

The raw materials shown in Table 4 were treated to obtain a foam in the same manner as in Example 1.

EXAMPLES 32 THROUGH 36

The raw materials shown in Table 4 were treated to obtain foams in the same manner as in Example 1.

Table 4

| Item | Compar. Example 11 | Example 32 | Example 33 | Example 34 | Example 35 | Example 36 |
|---|---|---|---|---|---|---|
| Reaction mixture (in parts) | | | | | | |
| Crude MDI | 115 | 115 | 115 | 115 | 115 | 115 |
| Polyol A | 100 | 100 | 100 | 100 | 100 | 100 |
| Silicone oil | 1 | 1 | 1 | 1 | 1 | 1 |
| Triethylenediamine | 0.5 | 0.5 | 0.5 | 0.5 | 0.5 | 0.5 |
| Dibutyl tin dilaurate | 0.1 | 0.1 | 0.1 | 0.1 | 0.1 | 0.1 |
| Trichloromonofluromethane | 25 | 27 | 30 | 32 | 33 | 35 |
| Tris(2-chloroethyl) phosphate | 10 | 10 | 10 | 10 | 10 | 10 |
| Potato starch | 0 (0%) | 13 (5%) | 29 (10%) | 46 (15%) | 65 (20%) | 88 (25%) |
| Ratio in chemical equivalent | 1.05 | 1.05 | 1.05 | 1.05 | 1.05 | 1.05 |
| Physical properties of foam | | | | | | |
| Apparent density (lb/ft$^3$) | 3.2 | 3.2 | 3.1 | 3.1 | 3.1 | 3.0 |

Table 4-continued become low smoke-generating by adding an adequate amount of starch.

Table 5

| | Example | | | | | | | | | | | |
|---|---|---|---|---|---|---|---|---|---|---|---|---|
| | 37 | 38 | 39 | 40 | 41 | 42 | 43 | 44 | 45 | 46 | 47 | 48 |
| Reaction mixture (in parts) | | | | | | | | | | | | |
| Crude MDI | 115 | 115 | 115 | 115 | 115 | 115 | 126 | 126 | 126 | 115 | 115 | 115 |
| Polyol A | 100 | 100 | 100 | 100 | 100 | 100 | 0 | 0 | 0 | 100 | 100 | 100 |
| Polyol B | 0 | 0 | 0 | 0 | 0 | 0 | 100 | 100 | 100 | 0 | 0 | 2 |
| Silicone oil | 1 | 1 | 1 | 1 | 1 | 1 | 1 | 1 | 1 | 1 | 1 | 1 |
| Triethylenediamine | 1.5 | 1.5 | 1.5 | 1.5 | 1.5 | 1.5 | 1.5 | 1.5 | 1.5 | 1.0 | 1.0 | 1.0 |
| Dibutyl tin dilaurate | 0.1 | 0.1 | 0.1 | 0.1 | 0.1 | 0.1 | 0.1 | 0.1 | 0.1 | 0.1 | 0.1 | 0.1 |
| Trichloromono- fluoromethane | 45 | 55 | 57 | 45 | 55 | 57 | 46 | 55 | 58 | 42 | 47 | 53 |
| Tris(2-chloroethyl) phosphate | 10 | 10 | 10 | 10 | 10 | 10 | 10 | 10 | 10 | 0 | 0 | 0 |
| Potato starch | 0 | 0 | 0 | 0 | 0 | 0 | 15 (5%) | 33 (10%) | 74 (20%) | 14 (5%) | 29 (10) | 68 (20%) |
| Corn starch | 14 (5%) | 31 (10%) | 70 (20%) | 0 | 0 | 0 | 0 | 0 | 0 | 0 | 0 | 0 |
| Wheat starch | 0 | 0 | 0 | 14 (5%) | 31 (10%) | 70 (15%) | 0 | 0 | 0 | 0 | 0 | 0 |
| Ratio in chemical equivalent | 1.05 | 1.05 | 1.05 | 1.05 | 1.05 | 1.05 | 1.05 | 1.05 | 1.05 | 1.05 | 1.05 | 1.05 |
| Physical properties of foam | | | | | | | | | | | | |
| Apparent density (lb/ft$^3$) | 1.9 | 1.9 | 1.9 | 1.9 | 2.0 | 2.0 | 1.9 | 1.9 | 1.9 | 1.8 | 1.9 | 1.9 |
| Flammability | ** | ** | ** | ** | ** | ** | ** | ** | ** | *** | *** | *** |
| $C_A$ | 36 | 24 | 17 | 33 | 21 | 17 | 35 | 25 | 16 | 32 | 21 | 15 |

Remarks:
** Self-extinguishment
*** Burning

| Item | Compar. Example 11 | Example | | | | |
|---|---|---|---|---|---|---|
| | | 32 | 33 | 34 | 35 | 36 |
| Flammability | ** | ** | ** | ** | ** | ** |
| $C_A$ | 52 | 38 | 31 | 24 | 22 | 21 |

Remark:
** Self-extinguishment

Figure 3:
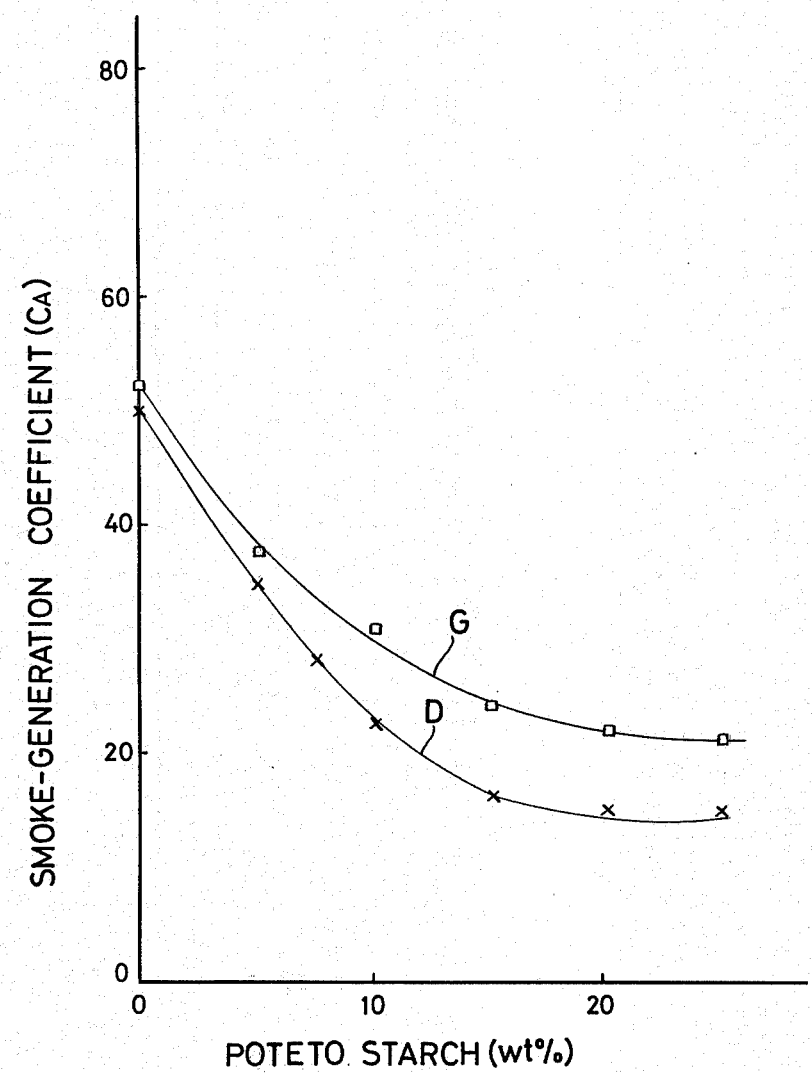

As is seen in Table 4, even when foams were made denser to an apparent density of about 3.1 lb/ft$^3$, the smoke-generating property was found to decrease with the increase in amount of potato starch added, as it was the case with the foams of apparent density about 1.9 lb/ft$^3$ illustrated in FIG. 3.

EXAMPLES 37 THROUGH 42

Foams were prepared from the raw materials which contained corn starch or wheat starch in place of potato starch in preceding Comparison Example 17 and the ratio in chemical equivalents was 1.05. Results are shown in Table 5. The values of $C_A$ are lower than those of conventional foams.

EXAMPLES 43 THROUGH 45

Using polyol B, instead of polyol A, foams were prepared as in Example 17. Results are shown in Table 5. The $C_A$ values are lower than those of conventional foams.

EXAMPLES 46 THROUGH 48

Foams were prepared in the same manner as in Example 17 except tris(2-chloroethyl) phosphate (10 parts).

Results are shown in Table 5.

It is seen that the rigid polyurethane foams, even if they are burning grade according to ASTM D 1692-68,

What is claimed is:

1. In a low smoke generating rigid polyurethane obtained by heating (A) a polyisocyanate, (B) a polyol having three or more hydroxy groups and a hydroxyl value of 100 and more than 100, and (C) a blowing agent, the improvement which comprises said ingredients (A), (B), and (C) being present in a ratio of chemical equivalents of 1 to 2 parts of ingredient (A) for 1 part of ingredients (B) and (C) combined which react with said ingredient (A), and mixed with at least one member selected from the group consisting of alkyl cellulose, carboxymethyl cellulose, acetyl starch, nitro starch and carboxymethyl starch in the form of powders in an amount exceeding 5% by weight of the composition.

2. The foam according to claim 1, in which a phosphoric ester, a metal oxide, or mixture thereof is used as a flame retardant.

3. The foam according to claim 2, in which the flame retardant is used in an amount of 10% by weight of the polyol.

4. In a process for preparing rigid polyurethane foam by mixing a polyisocyanate, a polyol having more than three hydroxy groups and a hydroxyl value equal to or greater than 100, and blowing agents, the improvement which comprises adjusting the ratio in chemical equivalent of polyisocyanate to the polyol and blowing agent which react with the polyisocyanate in the range between 2 : 1 and 1 : 1, and adding a polymer selected from the group consisting of alkyl cellulose, carboxymethyl cellulose, acetyl starch, nitro starch and carboxymethyl starch in the form of powders in an amount exceeding 5% by weight of the composition to the reaction mixture.

* * * * *

UNITED STATES PATENT OFFICE
CERTIFICATE OF CORRECTION

Patent No. 3,956,202     Dated May 11, 1976

Inventor(s) Kazuo Iwasaki

It is certified that error appears in the above-identified patent and that said Letters Patent are hereby corrected as shown below:

Column 12, Line 33, change "heating" to --mixing--.

Signed and Sealed this

Twentieth Day of September 1977

[SEAL]

Attest:

RUTH C. MASON  
Attesting Officer

LUTRELLE F. PARKER  
Acting Commissioner of Patents and Trademarks